United States Patent
Sawatari

(10) Patent No.: US 9,433,837 B2
(45) Date of Patent: Sep. 6, 2016

(54) INFORMATION TERMINAL, GOLF CLUB MANAGEMENT METHOD, AND PROGRAM

(75) Inventor: Shigeo Sawatari, Tokyo (JP)

(73) Assignee: DJANGO LTD., Tokyo (JP)

( * ) Notice: Subject to any disclaimer, the term of this patent is extended or adjusted under 35 U.S.C. 154(b) by 400 days.

(21) Appl. No.: 13/977,254

(22) PCT Filed: Dec. 28, 2011

(86) PCT No.: PCT/JP2011/080431
§ 371 (c)(1),
(2), (4) Date: Jun. 28, 2013

(87) PCT Pub. No.: WO2012/091103
PCT Pub. Date: Jul. 5, 2012

(65) Prior Publication Data
US 2013/0274034 A1   Oct. 17, 2013

(30) Foreign Application Priority Data
Dec. 29, 2010   (JP) .................. 2010-294417

(51) Int. Cl.
A63B 57/00   (2015.01)
G06Q 10/06   (2012.01)

(52) U.S. Cl.
CPC .............. *A63B 57/00* (2013.01); *G06Q 10/06* (2013.01)

(58) Field of Classification Search
CPC .............................. A63B 55/00; A63B 57/00
USPC ....................................................... 473/407
See application file for complete search history.

(56) References Cited

U.S. PATENT DOCUMENTS

| | | | | |
|---|---|---|---|---|
| 5,779,566 A * | 7/1998 | Wilens | ........... | A63B 69/36 473/131 |
| 7,881,499 B2 * | 2/2011 | Bissonnette | ....... | A63B 24/0021 382/106 |
| 7,892,114 B2 * | 2/2011 | Saegusa | ............. | A63B 24/0003 473/407 |
| 7,985,134 B2 * | 7/2011 | Ellis | ................... | H04N 5/44543 273/244 |
| 8,007,368 B2 * | 8/2011 | Solheim | ............. | A63B 69/3623 473/220 |
| 8,257,189 B2 * | 9/2012 | Koudele | ................ | A63B 43/00 473/155 |

(Continued)

FOREIGN PATENT DOCUMENTS

| | | |
|---|---|---|
| JP | 2002-000787 | 1/2002 |
| JP | 2002-318928 | 10/2002 |

(Continued)

OTHER PUBLICATIONS

International Search Report of PCT/JP2011/080431 (Apr. 10, 2012).

*Primary Examiner* — Michael Cuff
(74) *Attorney, Agent, or Firm* — Lex IP Meister, PLLC

(57) ABSTRACT

Provided is a golf club management system that enables easy management of detailed information on golf clubs and information on golf club settings. A golf bag display control unit (54) determines, from a golf bag configuration information table (58b), golf clubs stored in a golf bag designated by the user and further determines, from a golf club information table (58a), the type group each golf club belongs to. Next, it determines the type groups the types of the golf clubs stored in the golf bag are distributed to, and in accordance with the distribution pattern, determines the positions on a display device to show the images of the golf club heads. The image of a golf club head is created from a head image obtained with a head image data name, which is acquired from the golf club information table (58a).

7 Claims, 12 Drawing Sheets

(56) References Cited

U.S. PATENT DOCUMENTS

| | | | |
|---|---|---|---|
| 8,371,962 B2* | 2/2013 | Solheim | A63B 24/0021 473/131 |
| 8,538,801 B2* | 9/2013 | Giordano | G06Q 20/04 700/231 |
| 2005/0037827 A1* | 2/2005 | Perkins | A63F 13/10 463/9 |
| 2005/0227791 A1* | 10/2005 | McCreary | A63B 69/3658 473/407 |
| 2005/0272516 A1* | 12/2005 | Gobush | A63B 24/0003 473/200 |
| 2006/0030422 A1 | 2/2006 | Rankin | |
| 2009/0088276 A1* | 4/2009 | Solheim | A63B 24/0003 473/409 |
| 2009/0209358 A1* | 8/2009 | Niegowski | A43B 3/0005 473/223 |
| 2009/0298605 A1* | 12/2009 | Wiegers | A63B 57/00 473/199 |
| 2010/0009780 A1* | 1/2010 | Doherty | A63B 24/0021 473/407 |
| 2010/0179005 A1* | 7/2010 | Meadows | A63B 57/00 473/407 |
| 2011/0076657 A1* | 3/2011 | Forest | G06Q 10/10 434/252 |
| 2011/0178866 A1* | 7/2011 | Levine | G06Q 30/02 705/14.43 |
| 2011/0184538 A1* | 7/2011 | Baker | A63B 57/00 700/92 |
| 2011/0190078 A1* | 8/2011 | Heckendorf, III | G07F 17/3276 473/407 |
| 2011/0237358 A1* | 9/2011 | Carpenter | A63B 57/00 473/407 |

FOREIGN PATENT DOCUMENTS

| | | |
|---|---|---|
| JP | 2003-228640 | 8/2003 |
| JP | 2006-081767 | 3/2006 |
| JP | 2006-223551 | 8/2006 |
| JP | 2006-247023 | 9/2006 |
| JP | 2006-338336 | 12/2006 |
| JP | 2007-167195 | 7/2007 |
| JP | 2009-211671 | 9/2009 |

* cited by examiner

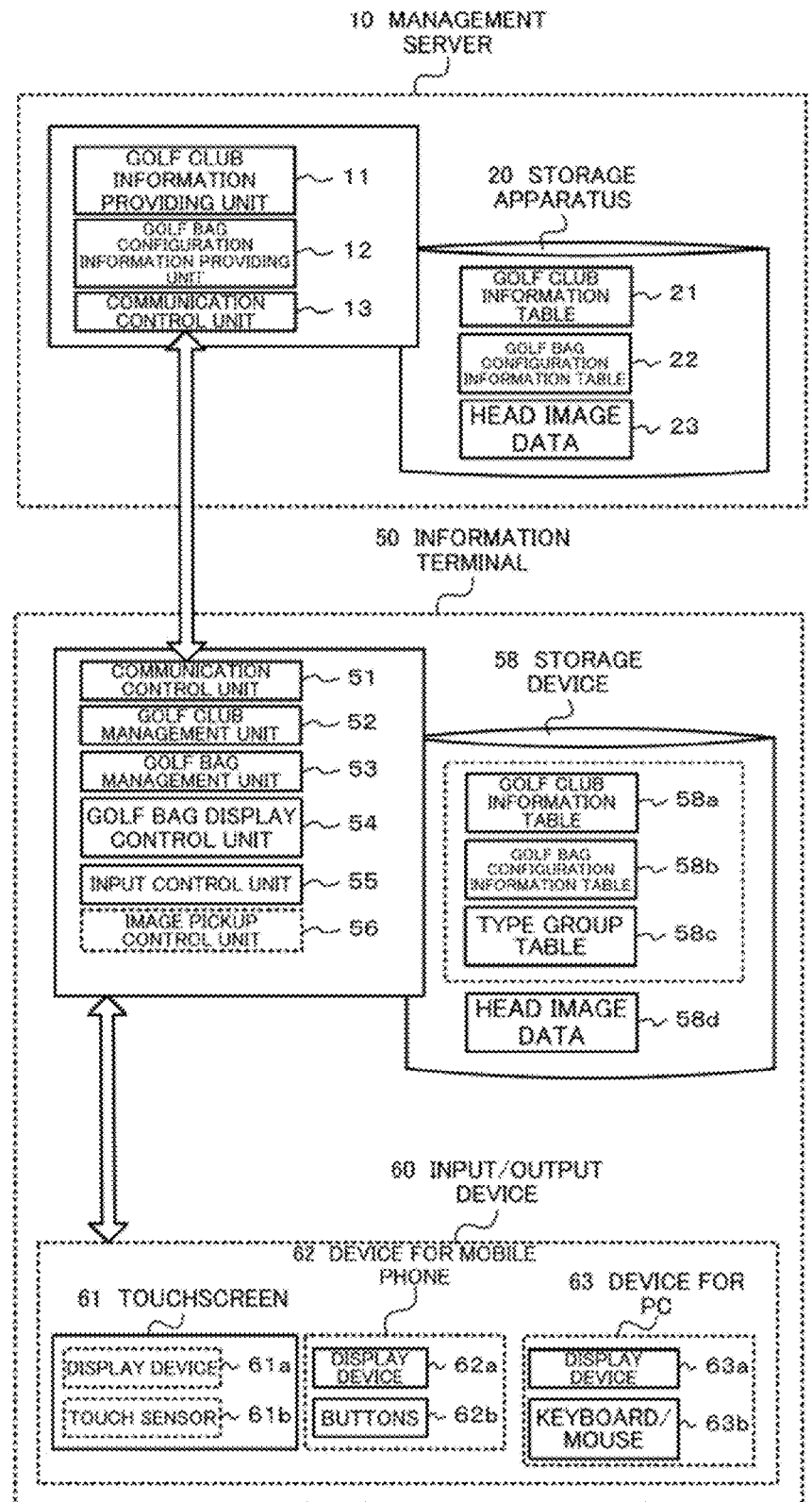

FIG. 3A

58a GOLF CLUB INFORMATION TABLE

| GOLF CLUB NO | TYPE | HEAD INFORMATION ||||  ... |
|---|---|---|---|---|---|---|
| | | HEAD IMAGE DATA NAME | BRAND | MODEL | LOFT ANGLE | |
| 0104 | Driver | 0104.jpg | DR_Head·· | DR_Head·· | 10.5 | ... |
| 0105 | Driver | 0105.jpg | DR_Head·· | DR_Head·· | 10.5 | ... |
| 0206 | 3W | 0306.jpg | 3W_Head·· | 3W_Head·· | 15 | ... |
| ... | ... | ... | ... | ... | ... | ... |

| SHAFT INFORMATION |||| CLUB INFORMATION | | |
|---|---|---|---|---|---|---|
| BRAND | MODEL | Flex | ... | CLUB LENGTH | ... | |
| DR_Shaft· | DR_Shaft· | S | ... | 45.75 | ... | ... |
| DR_Shaft· | DR_Shaft· | S | ... | 45.00 | ... | ... |
| 3W_Shaft· | 3W_Shaft· | S | ... | 43.00 | ... | ... |
| ... | ... | ... | ... | ... | ... | ... |

FIG. 3B

58b GOLF BAG CONFIGURATION INFORMATION TABLE

| GOLF BAG NO | NAME | DATE AND TIME OF CREATION | Driver | 2W | 3W | 4W |
|---|---|---|---|---|---|---|
| 0001 | MyBag1 | 2010/11·· | 0104 | O | 0290 | O |
| 0002 | MyBag2 | 2010/11·· | 0104 | O | Null | 0348 |
| 0003 | Pro T's Bag1 | 2010/11·· | 0105 | O | 0245 | Null |
| ... | ... | ... | ... | ... | ... | ... |

FIG. 3C

58c TYPE GROUP TABLE

| TYPE GROUP | TYPE | ORDER OF LAYOUT |
|---|---|---|
| DRIVER | Driver | 1 |
| FAIRWAY WOOD | 2W | 2 |
| | ... | |
| UTILITY | 1H | 3 |
| | ... | |
| ... | ... | ... |
| PUTTER | PT | 6 |

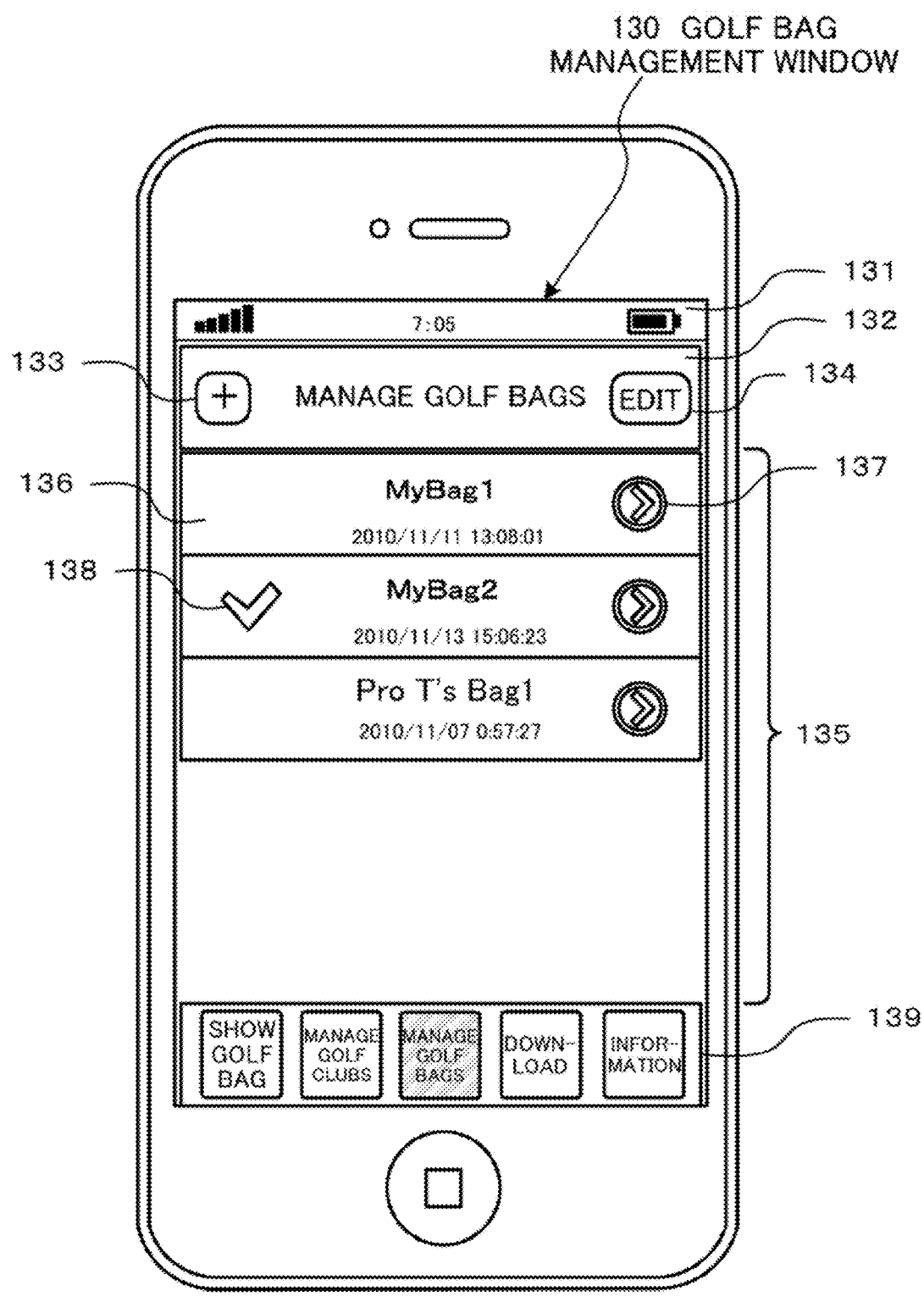

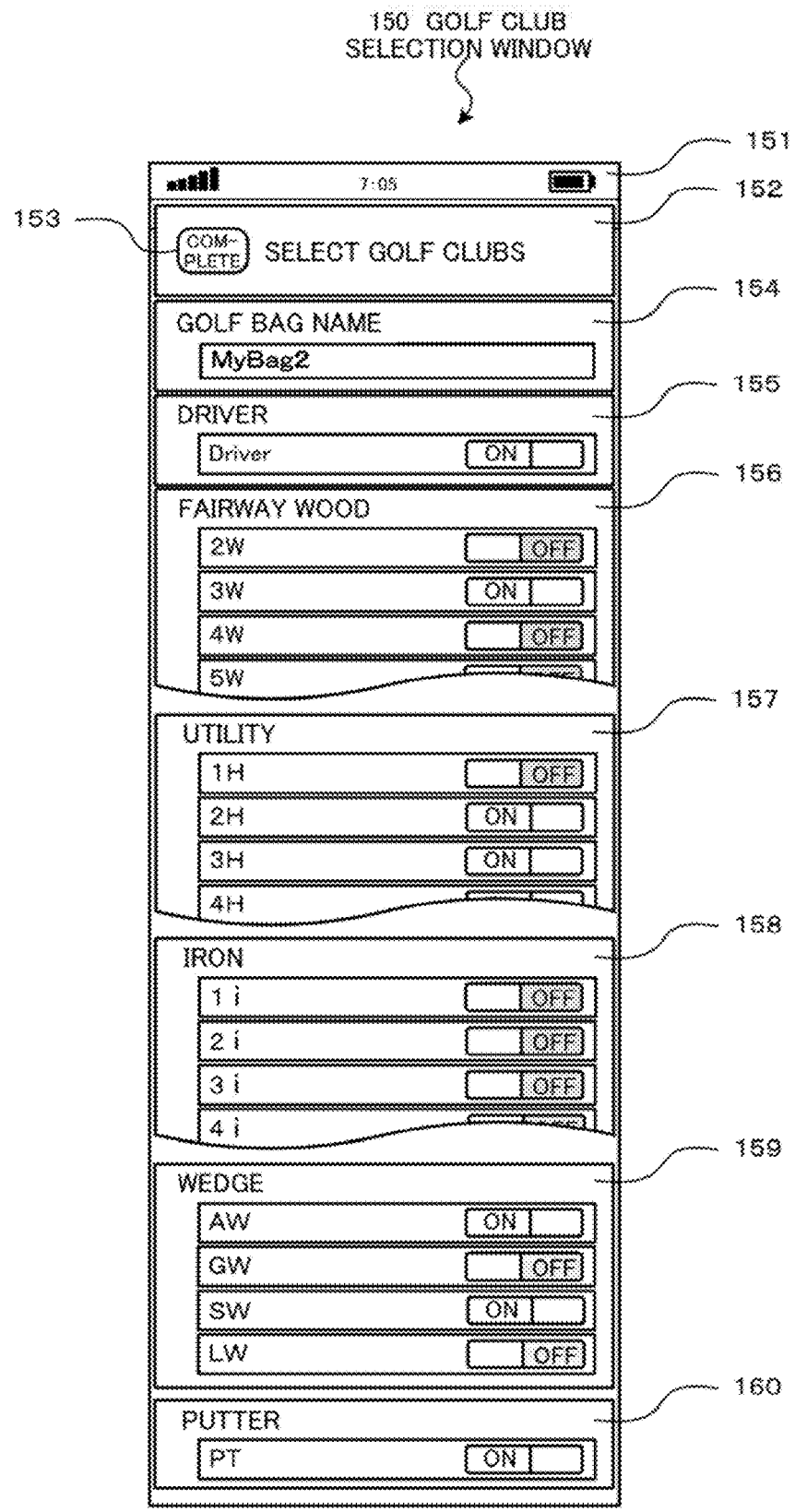

FIG. 7

170 GOLF CLUB INFORMATION DISPLAY WINDOW

| | | |
|---|---|---|
| 181 | | |
| | 7:85 | 171 |
| | GOLF CLUB INFORMATION | 172 |
| | MyBag2 | 173 |
| | 2010/11/13 15:06:23 | 182 |

183 — Driver

| | Head | Shaft | Club | Set Distance | Avg. Distance |
|---|---|---|---|---|---|
| 174 | D_Head-Brand01 | D_Shaft-Brand01 | 45" | 250y | — |
| | D_Head-Model01 | D_Shaft-Model01 | 315g | | |
| | 10.5° | S | D3 | | |

175 — 3W

| | Head | Shaft | Club | Set Distance | Avg. Distance |
|---|---|---|---|---|---|
| | 3W_Head-Brand02 | 3W_Shaft-Brand01 | 43" | 230y | — |
| | 3W_Head-Model02 | 3W_Shaft-Model01 | 325g | | |
| | 15° | S | D3 | | |

176 — 5W

| | Head | Shaft | Club | Set Distance | Avg. Distance |
|---|---|---|---|---|---|
| | 5W_Head-Brand02 | 5W_Shaft-Brand03 | 42.5" | 210y | — |
| | 5W_Head-Model02 | 5W_Shaft-Model03 | 335g | | |
| | 18° | S | D3 | | |

177 — 3H

| | Head | Shaft | Club | Set Distance | Avg. Distance |
|---|---|---|---|---|---|
| | #3_Head-Brand04 | #3_Shaft-Brand03 | 40.25" | 200y | — |
| | #3_Head-Model04 | #3_Shaft-Model03 | 345g | | |
| | 19° | S | D3 | | |

178

| | LW_Head-BrandA | LW_Shaft-Brand05 | 35.125" | 65y | — |
|---|---|---|---|---|---|
| | LW_Head-ModelA | LW_Shaft-Model05 | 488g | | |
| | 60° | S | D4 | | |

179 — PT

| | Head | Shaft | Club | Set Distance | Avg. Distance |
|---|---|---|---|---|---|
| | PT_Head-Brand04 | PT_Shaft-Brand02 | 34" | — | — |
| | PT_Head-Model04 | PT_Shaft-Model02 | 400g | | |
| | 3° | — | D4 | | |

180 — SHOW GOLF BAG | MANAGE GOLF CLUBS | MANAGE GOLF BAGS | DOWNLOAD | INFORMATION

FIG. 9A

[PATTERN 1]

| TYPE GROUP | TYPE | ORDER OF LAYOUT |
|---|---|---|
| DRIVER | Driver | 1 |
| FAIRWAY WOOD | 2W | 2 |
| | 3W | |
| | 4W | |
| | 5W | |
| | 6W | |
| | 7W | |
| | 9W | |
| | 11W | |
| | 13W | |
| UTILITY | 1H | 3 |
| | 2H | |
| | 3H | |
| | 4H | |
| | 5H | |
| | 6H | |
| | 7H | |
| IRON | 1i | 4 |
| | 2i | |
| | 3i | |
| | 4i | |
| | 5i | |
| | 6i | |
| | 7i | |
| | 8i | |
| | 9i | |
| | PW | |
| WEDGE | AW | 5 |
| | GW | |
| | SW | |
| | LW | |
| PUTTER | PT | 6 |

FIG. 9B

[PATTERN 2]

| TYPE GROUP | TYPE | ORDER OF LAYOUT |
|---|---|---|
| DRIVER | Driver | 1 |
| LONG PUTTER | Long PT | 2 |
| FAIRWAY WOOD | 2W | 3 |
| | 3W | |
| | 4W | |
| | 5W | |
| | 6W | |
| | 7W | |
| | 9W | |
| | 11W | |
| | 13W | |
| MIDDLE PUTTER | Middle PT | 4 |
| UTILITY | 1H | 5 |
| | 2H | |
| | 3H | |
| | 4H | |
| | 5H | |
| | 6H | |
| | 7H | |
| IRON | 1i | 6 |
| | 2i | |
| | 3i | |
| | 4i | |
| | 5i | |
| | 6i | |
| | 7i | |
| | 8i | |
| | 9i | |
| | PW | |
| WEDGE | AW | 7 |
| | GW | |
| | SW | |
| | LW | |
| PUTTER | Short PT | 8 |

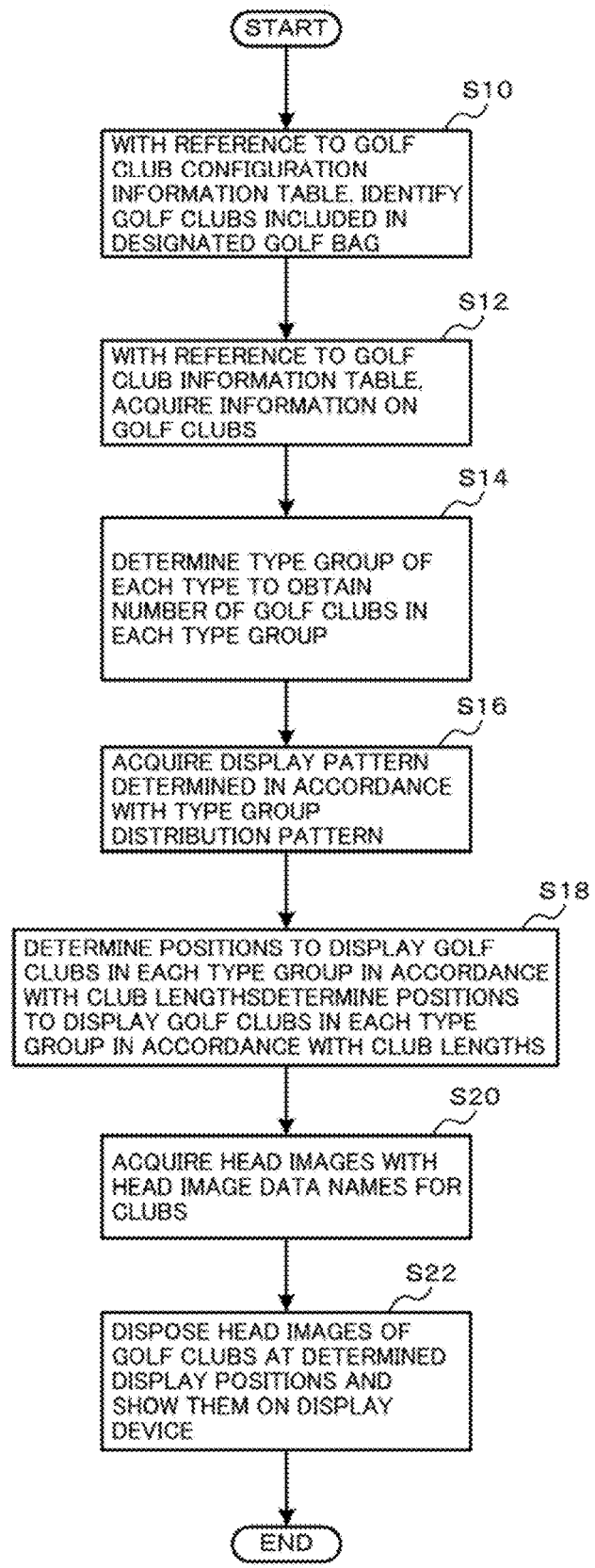

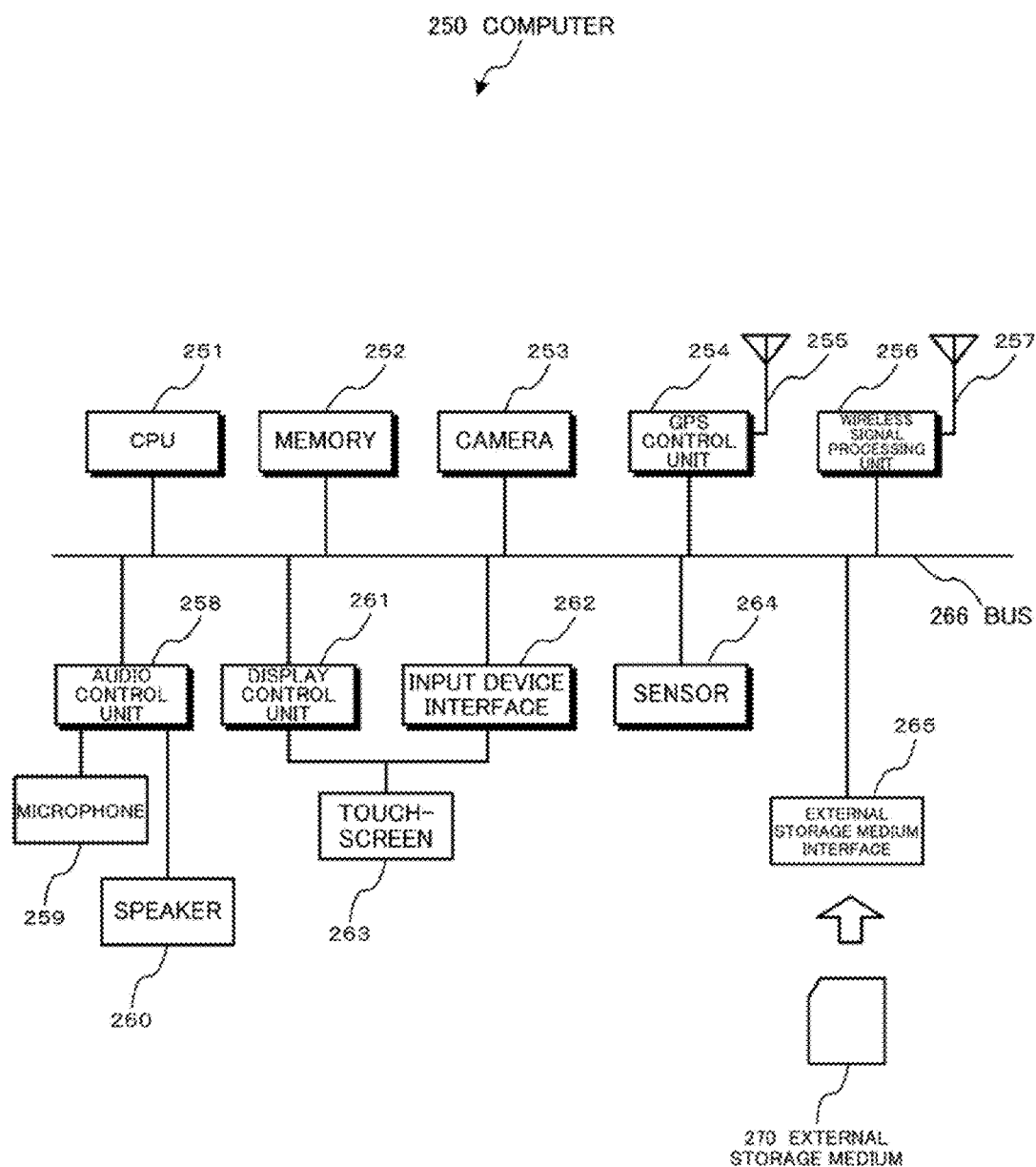

INFORMATION TERMINAL, GOLF CLUB MANAGEMENT METHOD, AND PROGRAM

TECHNICAL FIELD

The present invention relates to an information terminal for managing and displaying information on golf clubs stored in a golf bag.

BACKGROUND ART

Golf is a globally popular sport and its player population is large. Professional tournaments are widely held, while many amateur golfers frequently go to the practice range or enjoy playing in the course. In Japan, golf is becoming more popular in recent years because of good showing of young professional golfers.

Golf is a game in which each player uses a plurality of different golf clubs to hit a ball and competes for the fewest shots until the ball falls into cups (holes). There are various types of golf clubs selectable depending on the distance and the angle of the shot, the position of the ball, the situation in the game, and other conditions. Examples of the major types are driver, fairway wood, utility (hybrid), iron, wedge, and putter.

The driver and fairway woods are included in the type of golf clubs called woods; the number one wood (1W) is called the driver, the other woods are called fairway woods. The driver is a golf club usually used on the teeing ground for the first shot; it has the longest shaft among the clubs to carry the ball a long distance. A putter is a golf club usually used on the green; it is used to hit a ball on the green with precise control to drop the ball into the cup. Between the aforementioned driver and the putter, golf clubs such as fairway woods, utilities, irons, and wedges are used; in general, the shaft lengths are shorter and the loft angles are larger from the woods to the wedges.

In this way, golf clubs are different in characteristics depending on the type; the player selects a proper club to use from these clubs depending on the distance to the cup or the condition of the place where the ball is. For a type of club, for example the type of driver, various clubs are available from many manufacturers; they are all different in properties such as shaft length and loft angle. Accordingly, it is important for a player to select clubs suitable for him/her from such a variety of clubs in consideration of his/her stroke style, skill, and preference.

In rounding a golf course, a player carries a plurality of clubs stored in a golf bag (also called a caddie bag or a golf set). According to the official rules, however, he/she is permitted to use only 14 clubs at most. Accordingly, the player has to select the clubs to be stored in the bag more carefully. First, the player selects the types for the clubs. For example, the player may select one driver, two fairway woods (3W and 5W), one utility (2H), eight irons (3i to 9i and PW), one wedge (SW), and one putter, which come to fourteen clubs in total, as a pattern. In addition to this, various patterns are available; for example, the driver may be canceled from this pattern to add one fairway wood. Such selection of golf clubs is generally called golf club setting or club setting.

Next, the player selects the manufacturer (brand) and the model of each club. Some players including professional golfers design the properties of the clubs and adjust ready-made clubs by themselves or custom-order such clubs to have tuned-up optimum clubs for themselves. Furthermore, it is common to change head-shaft combinations or replace grips.

In view of the above, a golfer is required to remember various patterns of golf club settings for various conditions and diverse information on each club in possession; he/she is also required to manage such information to see or update as necessary. In the meanwhile, there exist needs to acquire and see information on golf club settings of third persons, who may be professional golfers and other players, or information on golf clubs other than his/her own clubs.

To support such golf club management described above, the golf club information providing system disclosed in Patent Literature 1 provides a function to store and manage design specifications of golf clubs matching a trial swing of a client (in purchasing golf clubs) in association with registration information unique to the client; the function further stores and manages golf clubs currently used by the client.

CITATION LIST

Patent Literature

Patent Literature 1: Japanese unexamined patent application publication No. 2006-247023

SUMMARY OF INVENTION

Technical Problem

In the golf club information providing system according to Patent Literature 1, however, the information on golf clubs to be managed is only model numbers and the golf clubs to be managed are only one each of driver, fairway wood, iron, and putter, which come to four clubs in total.

Such a system cannot manage detailed information on numerous golf clubs; as a natural consequence, it cannot manage golf club settings.

Furthermore, this system does not have a way for the user, who is an owner of golf clubs, to input information on a golf club. Still further, detailed information on golf clubs or golf club settings is never provided by a third person including the manufacturer.

The golf club information providing system according to Patent Literature 1 does not graphically show information on golf clubs so that the user cannot graphically grasp the information on golf clubs.

The golf club information providing system according to Patent Literature 1 aims to promote the sales of golf clubs; it provides information only at the place of trial swing. Accordingly, golfers have limitations in place or situation to acquire such information on golf clubs.

An object of the present invention is therefore to provide an information terminal which enables easy management of detailed information on golf clubs and information on golf club settings.

Another object of the present information is to provide an information terminal having a way for the user, who is an owner of golf clubs, to freely input information on a golf club or information on golf club settings anytime. Yet another object of the present invention is to provide an information terminal that enables the user to acquire information on golf clubs or information on golf club settings from a third person.

Still another object of the present invention is to provide an information terminal that displays information on golf clubs and information on golf club settings graphically. Still another object of the present invention is to provide an information terminal configured as a portable device that manages information on golf clubs and information on golf club settings so that the user can see or update the information anywhere.

Solution to Problem

The first aspect of the present invention is an information terminal including a storage unit for storing types of golf clubs by individual golf club and storing head images of golf clubs, a golf club management unit for managing the golf clubs in association with head images of the golf clubs or head images of other golf clubs, and a display control unit for controlling head images individually associated with a plurality of golf clubs to be displayed to be shown on a display device. The information terminal is configured so that the display control unit determines positions to display the head images based on a type group distribution pattern indicating how many golf clubs of the plurality of golf clubs to be displayed belong to each of type groups, which includes one or more of the types. Such a configuration of information terminal enables a golf club setting composed of a plurality of golf clubs to be displayed graphically and in such a manner that the golf clubs are stored in a golf bag.

The second aspect of the present invention is an information terminal of the first aspect configured so that the storage unit stores information indicating golf clubs belonging to each golf bag; and the display control unit determines that golf clubs belonging to a golf bag specified by a user or in accordance with predetermined conditions are to be displayed. Such a configuration of information terminal enables golf clubs stored in a specific golf bag are displayed graphically and in such a manner that the golf clubs are stored in the golf bag.

The third aspect of the present invention is an information terminal of the first aspect configured so that the storage unit stores other information on the golf clubs by individual golf club; the head images shown on the display device are selectable by a user; and when one of the head images is selected, the display control unit i shows at least part of the other information on a golf club associated with the selected head image on the display device. Such a configuration of information terminal enables easy management of detailed information on golf clubs and information on golf club settings.

The fourth aspect of the present invention is an information terminal of the first aspect configured so that the display control unit shows the head images of the golf clubs in image groups collected by type group on the display device, while each of the image groups shows head images of golf clubs belonging to the same type group to be adjacent to or overlapped with one another.

The fifth aspect of the present invention is an information terminal of the fourth aspect configured so that positions in height to display the image groups are determined depending on corresponding type groups, and adjusted to satisfy at least one of the relations: (A) that a top of an image group determined to be displayed at a higher position is positioned higher than a top of an image group determined to be displayed at a lower position; and (B) that a bottom of an image group determined to be displayed at a higher position is positioned higher than a bottom of an image group determined to be displayed at a lower position.

The sixth aspect of the present invention is an information terminal of the fifth aspect configured so that the storage unit stores club lengths of the golf clubs by individual golf club; and the display control unit compares club lengths of golf clubs associated with head images included in an image group for each image group and adjust positions to display the head images in the image group in such an arrangement that golf clubs having longer club lengths are positioned higher.

The seventh aspect of the present invention is an information terminal of the first aspect further including a communication control unit for connecting to an external network and controlling data transmission and reception, and the information terminal is configured so that the golf club management unit acquires, in accordance with an instruction of a user, at least either the type or the head image for each of the golf clubs from a predetermined server via the external network.

The eighth aspect of the present invention is a golf club management method in an information terminal including a display device for showing information and a storage unit storing types of golf clubs by individual golf club and head images of golf clubs, including a golf club management step for managing the golf clubs in association with head images of the golf clubs or head images of other golf clubs and a display control step for controlling head images individually associated with a plurality of golf clubs to be displayed to be shown on a display device, wherein the display control step is configured to determine positions to display the head images based on a type group distribution pattern indicating how many golf clubs of the plurality of golf clubs to be displayed belong to each of type groups, each type group including one or more of the types.

The ninth aspect of the present invention is a golf club management method of the eighth aspect configured so that the storage unit stores information indicating golf clubs belonging to each golf bag; and the display control step determines that golf clubs belonging to a golf bag specified by a user or in accordance with predetermined conditions are to be displayed.

The tenth aspect of the present invention is a program for causing an information terminal including a display device for showing information and a storage unit storing types of golf clubs by individual golf club and head images of golf clubs to perform the functions of a golf club management unit for managing the golf clubs in association with head images of the golf clubs or head images of other golf clubs and a display control unit for controlling head images individually associated with a plurality of golf clubs to be displayed to be shown on a display device, wherein the display control unit is configured to determine positions to display the head images based on a type group distribution pattern indicating how many golf clubs of the plurality of golf clubs to be displayed belong to each of type groups, each type group including one or more of the types.

The eleventh aspect of the present invention is a program of the tenth aspect configured so that the storage unit stores information indicating golf clubs belonging to each golf bag; and the display control unit determines that golf clubs belonging to a golf bag specified by a user or in accordance with predetermined conditions are to be displayed.

Advantageous Effects of Invention

An information terminal according to the present invention enables easy management of detailed information on golf clubs and information on golf club settings. The user, who is an owner of golf clubs, can freely input information on golf clubs and information on golf club settings to the information terminal anytime and further, can acquire such information from a third person.

The information terminal according to the present invention further displays information on golf clubs and information on golf club settings graphically. If the information is managed in a portable device, the user can see or update the information anywhere.

BRIEF DESCRIPTION OF DRAWINGS

FIG. 2 is a functional block diagram of the golf club management system according to an embodiment of the present invention.

FIGS. 3A, 3B, and 3C are a set of schematic diagrams illustrating examples of databases used in the golf club management system according to an embodiment of the present invention.

FIG. 5 is a schematic diagram illustrating an example of a golf bag management window appearing in the golf club management system according to an embodiment of the present invention.

FIG. 6 is a schematic diagram illustrating an example of a golf club selection window appearing in the golf club management system according to an embodiment of the present invention.

FIG. 7 is a schematic diagram illustrating an example of a golf club information display window appearing in the golf club management system according to an embodiment of the present invention.

FIGS. 9A and 9B are a set of schematic diagrams illustrating examples of a type group table used in the golf club management system according to an embodiment of the present invention.

FIG. 11 is a flowchart illustrating a process flow of an example of golf bag display control which is performed in the golf club management system according to an embodiment of the present invention.

FIG. 12 is a schematic diagram illustrating an example of hardware configuration of the information terminal (computer) in the present invention.

REFERENCE SIGNS LIST

Figure 1:
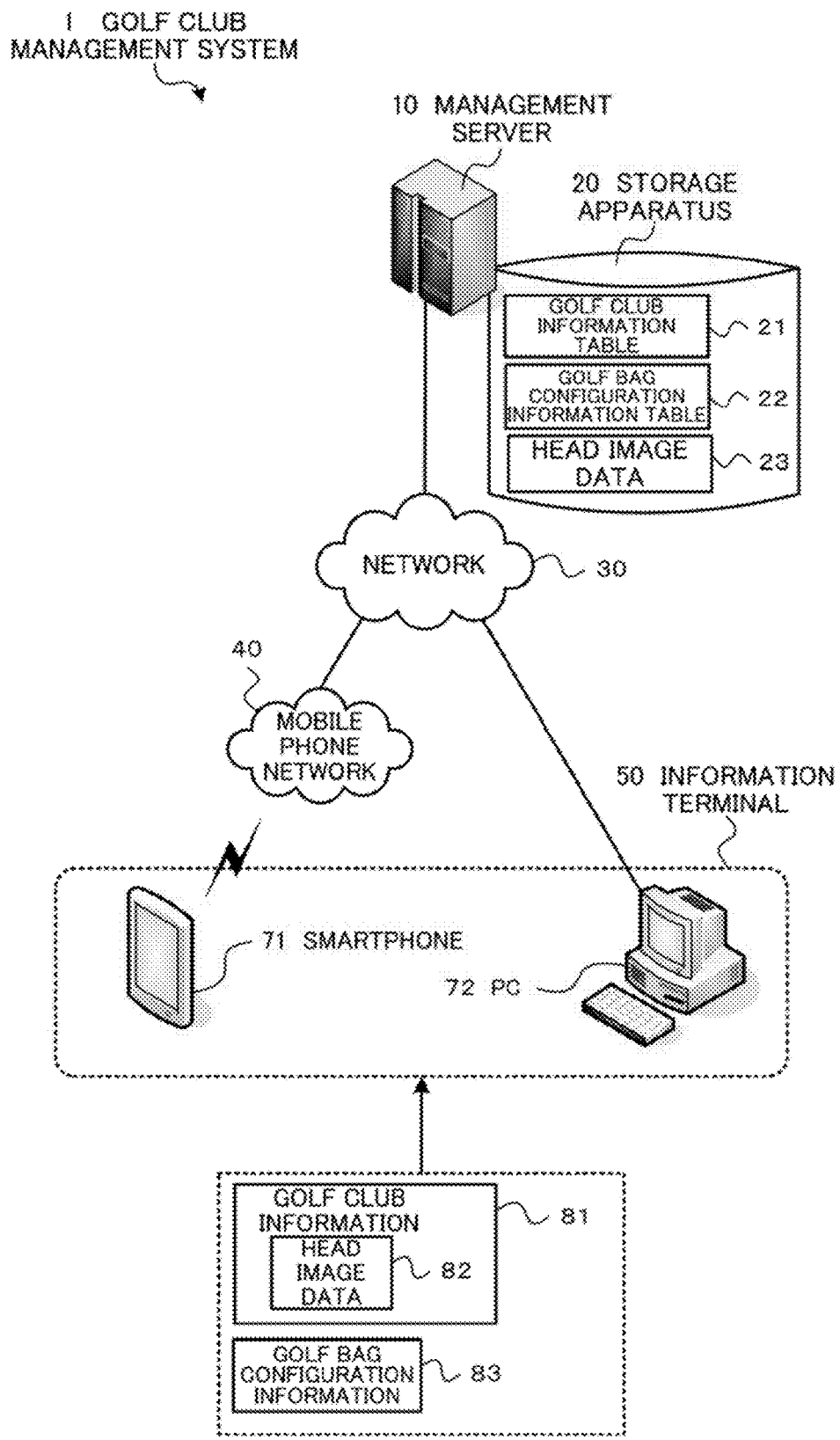
FIG. 1 is a schematic diagram illustrating an overview of the golf club management system including an information terminal of the present invention.

1 Golf club management system
10 Management server
20 Storage apparatus
30 Network
40 Mobile phone network
50 Information terminal
71 Smartphone
72 PC
81 Golf club information
82 Head image data
83 Golf bag configuration information

DESCRIPTION OF EMBODIMENTS

The golf club management system including an information terminal according to the present invention manages information on golf clubs and information to select golf clubs to be stored in golf bags (namely, information on golf club settings). The golf club management system further displays images of the heads of the golf clubs selected to be stored in a golf bag in such a manner and positions that they are stored in a golf bag.

First, an overview of the golf club management system 1 according to an embodiment of the present invention is described with reference to FIG. 1. The golf club management system 1 includes a management server 10 and an information terminal 50; the management server 10 is a server provided by a company or organization that manages and operates the golf club management system 1 and is connected to the management terminal 50 via a network 30. The network 30 here is a network such as the Internet using a communications protocol IP; however, it is not limited to this but may be a network selected from networks using other protocols, networks including dedicated communication channels, and various networks constructed with combinations of these networks and the Internet. The golf club management system 1 can be configured with only the information terminal 50 (in other words, as a standalone system of the information terminal 50).

The information terminal 50 is an electronic device such as a smartphone 71 or a PC (personal computer) 72. The smartphone 71 is a portable information terminal having the functions of a mobile phone and a PDA (personal digital assistance); however, various kinds of portable information terminals, such as a mobile phone, a PDA, and an e-book terminal, can be used as an information terminal 50. As shown in FIG. 1, the smartphone 71 is connected to the management server 10 via a mobile phone network 40 and the network 30; however, it can be connected to the management server 10 via a network other than the mobile phone network 40, such as a wireless LAN.

The information terminal 50 acquires golf club information 81 including head image data 82 and golf bag configuration information 83 indicating the golf clubs to be in a golf bag through user input or other means and stores them in a storage device. The head image data 82 here is a still image or video image of the appearance of a golf club head and is stored in head image data 58d in the storage device of the information terminal 50 as described later. A head image data associated with a golf club to be displayed is shown as a head image on the display device of the information terminal 50.

The storage apparatus 20 connected from the management server 10 holds a golf club information table 21, a golf bag configuration information table 22, and head image data 23; the user can download aforementioned data in this storage apparatus 20 to the storage device of the information terminal 50 by a predetermined operation. The storage apparatus 20 may be located at a different site from the management server 10 as long as it is accessible via the network 30.

In FIG. 1, the information on golf clubs is prepared and held in the storage apparatus 20; however, the information may be provided to the information terminal 50 directly (or via the management server 10) from a server of a golf-related company or organization, such as a manufacturer of golf clubs or golf bags.

Next, with reference to the functional block diagram of FIG. 2, an overview of the functions of the information terminal 50 and the management server 10 is described. First, the functions of the information terminal 50 are described. The information terminal 50 includes functional units of a communication control unit 51, a golf club management unit 52, a golf bag management unit 53, a golf bag display control unit 54, an input control unit 55, and an image pickup control unit 56. A storage device 58, which may be made of a flash memory or a hard disk, stores a golf club information table 58a, a golf bag configuration information table 58b, a type group table 58c, and head image data 58d.

The communication control unit 51 controls transmission and reception of data such as golf club information with the later-described communication control unit 13 of the management server 10 via the network 30 or the mobile phone network 40. If the information terminal 50 is a standalone system to provide the golf club management system 1 of the present invention, the communication control unit 51 is not a requisite function.

The golf club management unit 52 stores golf club information registered in (input to) the golf club information table 58a by a user through a GUI (Graphical User Interface) and, in response to an instruction of the user, shows the golf club information on the display device of the information terminal 50. For the golf club information, the type of golf club is stored for each club as shown in the golf club information table 58a in FIG. 3A. For the other golf club information, identification number (golf club number) for identifying individual golf clubs in this system, head information, shaft information, and club information are provided as labeled in the golf club information table 58a by way of example. The terms for the types of golf clubs in this description are commonly used ones to indicate the use and characteristics, for example, [Driver], [3W], [1H], [2i], [SW], and [PT]. In this description, the terms indicating the types are provided between brackets ([,]) for convenience.

The head information includes detailed information about the head of the golf club, such as a head image data name, a brand, a model, and a loft angle; the shaft information includes detailed information about the shaft of the golf club, such as a brand, a model, and a flex; and the club information includes detailed information about the golf club, such as a club length. The head image data name is the name of image data holding the head image associated with the club and the image data itself is stored in the head image data 58d. When showing the head image on the display device, the head image data 58d is accessed with the name to show the associated head image.

Each of the head images stored in the head image data 58d is a still image or a video image of the appearance of a golf club head; the image data is of at least a part of the golf club head viewed from one direction. This head image may be original image data obtained by a pickup device or image data edited or adjusted somehow, for example, by scaling the image or removing the background. It does not need to be an image obtained by a pickup device such as a camera or a video camera but may be an illustration or cartoon. This head image is associated with a specific golf club and is shown on the display device of the information terminal 50. Such a head image may be downloaded from the later-described head image data 23 of the management server 10 and stored without change or after being edited or adjusted as described above.

A head image is basically associated with a golf club which is the object of an image, but may be associated with one or more golf clubs other than the particular golf club. For golf clubs having similar heads, like irons, an image of a golf club head having a representative appearance may be taken and associated with all irons.

The golf club management unit 52 can also acquire golf club information from the golf club information table 21 of the management server 10 to incorporate it in the golf club information table 58 of the information terminal 50 or show it on the display device in accordance with an instruction of the user or other instructions. The information stored in the golf club information table 21 is almost the same as the information stored in the golf club information table 58a shown in FIG. 3A.

The golf bag management unit 53 manages one or more golf bags and stores the club setting for each golf bag. More specifically, it stores golf bag configuration information registered in (input to) the golf bag configuration information table 58b by the user through the GUI and shows the golf bag configuration information on the display device of the information terminal 50 in response to an instruction of the user. The golf bag configuration information includes identification numbers (golf bag numbers) for identifying individual golf club bags in this system, the names of golf bags, dates and times of creation, and golf club numbers specific to the types of golf clubs (the aforementioned types such as [Driver] and [3W]), as labeled in the golf bag configuration information table 58b of FIG. 3B by way of example. The golf bag configuration information table 58b is configured to store, if a type of golf club is initially determined not to be included, a value "0" in the entry associated with the type of golf club, and to store a value "Null" if the type of golf club is determined to be included but a golf club has not been specified yet. The golf bag configuration information table 58b indicates the club setting of each golf bag, in other words, the types and the numbers of golf clubs included in the golf bag.

It should be noted that, since the type of a golf club can be identified from the golf club number in the golf club information table 58a, it is not necessary to store the golf club numbers together with individually labeled types as shown in the golf bag configuration information table 58b; however, this example employs this configuration for clarity of explanation.

The golf bag management unit 53 can also acquire golf bag configuration information from the golf bag configuration information table 22 of the management server 10 to incorporate it into the golf bag configuration information table 58b of the information terminal 50 or show it on the display device in accordance with an instruction of the user or other instructions (the golf club information on the golf clubs included in this golf bag configuration information is automatically acquired from the golf club information table 21 as necessary). The information stored in the golf bag configuration information table 22 is almost the same as the information stored in the golf bag configuration information table 58b shown in FIG. 3B. This function enables the user to easily see golf club settings of professional golfers.

The golf club management system 1 of the present invention can manage various golf bags by including the names of players or tournaments in the names of the golf bags. However, if the golf bag configuration information table 58b is configured to include information on players or tournaments, the golf club management system 1 can show the golf bags more effectively. For example, it can show only the golf bag of the user or some professional player T, or the golf bags of professional players in some tournament in some year.

In such cases, it is preferable to use data input by the user through the information terminal 50 for the golf bag configuration information on the user and to use data provided from the management server 10 or other source for the golf bag configuration information on the other players.

The golf bag display control unit 54 shows head images associated with the golf clubs stored in one or more golf bags designated by the user (or automatically selected in accordance with predetermined conditions) on the display device of the information terminal 50 in such a manner and positions that the golf clubs are stored in the golf bags. The layout of the head images is determined depending on the pattern (type group distribution pattern) representing the numbers of golf clubs belonging to individual type groups in a golf bag.

The type groups are obtained by grouping the aforementioned types by use and characteristics of golf clubs; a type group includes at least one type. These type groups can be determined as appropriate by a designer or user of the golf club management system; for example, the grouping is defined by the type group table 58c shown in FIG. 3C. In this description, the terms indicating type groups are provided between angles (<, >) for convenience. To show head images, the golf bag display control unit 54 acquires information on which golf clubs are stored in which golf bag from the golf bag configuration information table 58b and acquires information on golf clubs such as head images from the golf club information table 58a.

The golf bag display control unit 54 can also show not only the golf clubs stored in a golf bag, but also a plurality of golf clubs designated by the user or golf clubs automatically selected by the system as those satisfying predetermined conditions. In such a case too, the golf bag display control unit 54 controls the layout of the head images in accordance with the type group distribution pattern.

The input control unit 55 acquires information input by the user from the input/output device 60 to provide the information to the relevant functional unit. The input device to control depends on the information terminal 50 used by the user. FIG. 2 provides three typical examples for the input/output device 60. The touchscreen 61 is a combination device of a display and an input device to be used in a smartphone 71, in which the touch sensor 61b corresponds to the input device. When the user touches the surface of the liquid crystal panel, which also functions as an output device (display device 61a), with a finger, a stylus, or other tool, the touch sensor 61 informs the input control unit 55 of the position of the touch as input information.

The device for mobile phone 62 is an input/output device commonly used in a mobile phone. The display device 62a, which is typically made of an LCD, is an output device; the set of buttons 62b, which sends input signals in response to hold-down by the user, is an input device. The display device 62a and the buttons 62b are provided in a single mobile phone. The device for PC 63 is an input/output device commonly used in a personal computer. The display device 63a, which is typically made of an LCD, is an output device; the keyboard/mouse 63b, which sends input signals in response to hold-down by the user, is an input device. The display device 63a and the keyboard/mouse 63b may be integrated with the package of the PC 72 or structured as separate packages and connected to the PC 72 with cables.

The image pickup control unit 56 is a function required if the information terminal 50 has a built-in pickup device (not shown) such as a camera. For example, when the user issues an instruction to take a picture of a golf club head, the golf club management unit 52 activates a camera module. The image pickup control unit 56 controls the camera module to take a picture of the head in accordance with the user's instruction. The picked-up image is stored in the head image data 58d in a predetermined image format without change (or after editing or adjusting). If the information terminal 50 does not have a built-in pickup device, this image pickup control unit 56 is not necessary.

Next, the functions of the management server 10 are described. The management server 10 includes a golf club information providing unit 11, a golf bag configuration information providing unit 12, and a communication control unit 13. The storage apparatus 20 of the management server 10 stores a golf club information table 21, a golf bag configuration information table 22, and head image data 23.

The golf club information providing unit 11 is, when the user instructs the information terminal 50 to acquire golf club information from the management server 10, to acquire information on the golf clubs designated by the user from the golf club information table 21 and the head image data 23 in accordance with a request of the golf club management unit 52 and provides the acquired information to the information terminal 50 via the network 30.

The golf bag configuration information providing unit 12 is, when the user instructs the information terminal 50 to acquire golf bag configuration information from the management server 10, to acquire golf bag configuration information on the golf bag designated by the user from the golf bag configuration information table 22 in accordance with a request of the golf bag management unit 53 and provides the acquired information to the information terminal 50 via the network 30.

The communication control unit 13 controls communications of data, such as golf club information, golf bag configuration information, and head image data, between the management server 10 and the information terminal 50 via the network 30 or the mobile phone network 40. The head images stored in the head image data 23 are downloaded to the information terminal 50; they may be edited or adjusted as necessary before being stored in the head image data 23 or when being downloaded.

Figure 4:
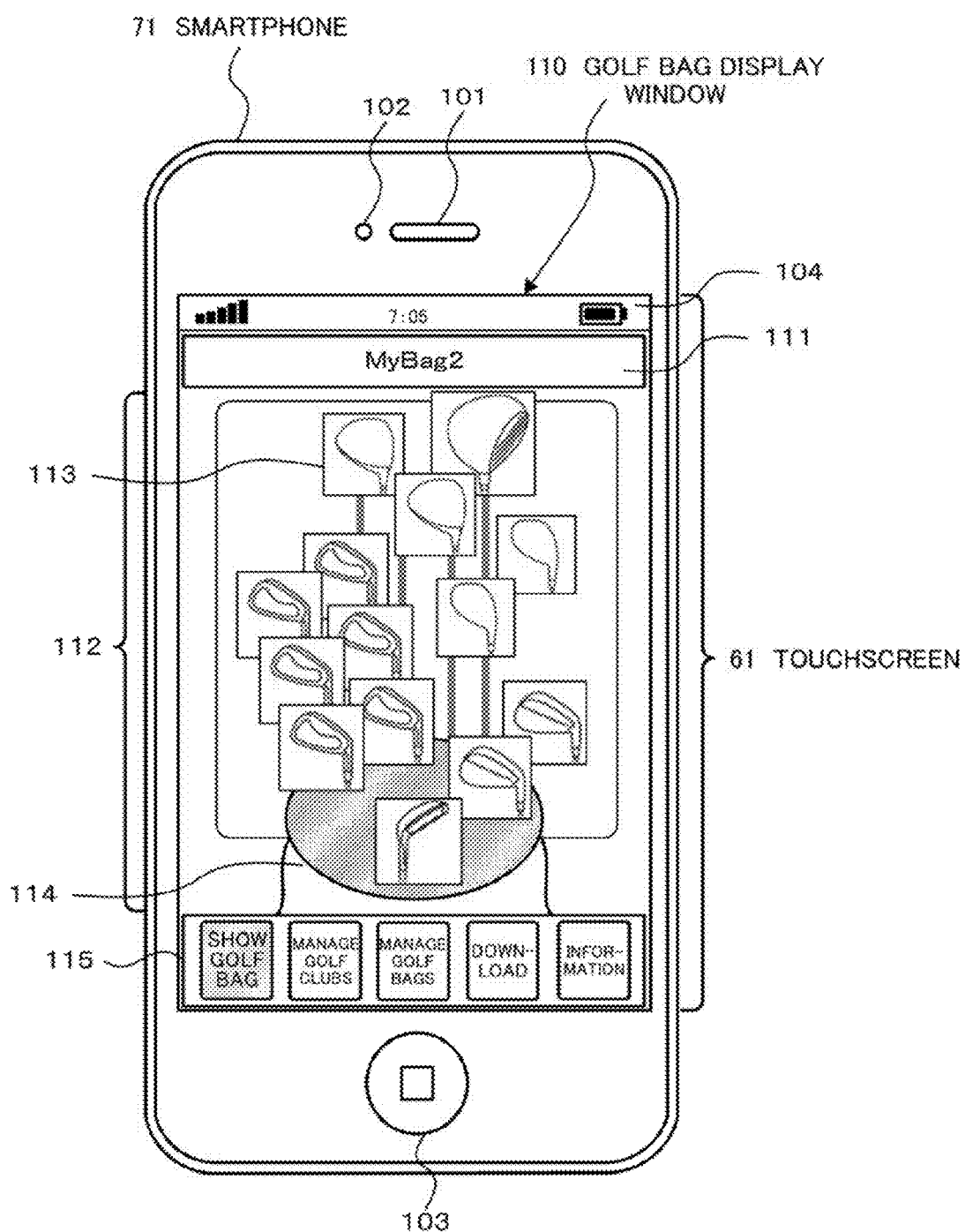
FIG. 4 is a schematic diagram illustrating an example of a golf bag display window appearing in the golf club management system according to an embodiment of the present invention.

Next, with reference to FIG. 4, an example of a golf bag display window 110 is described, which is shown on the display device of the information terminal 50 according to an embodiment of the present invention. FIGS. 4 to 8 are examples in the case where a smartphone 71 is used as an information terminal 50.

The smartphone 71 shown in FIG. 4 includes a touchscreen 61, which functions as a display device 61a for showing information and also functions as a touch sensor 61b for detecting a touch of the user, a speaker 101, a sub camera 102, and a home button 103.

In FIG. 4, the head images of golf clubs stored in a golf bag designated by the user are shown by the above-described golf bag display control unit 54 in such a manner and positions that they are stored in the golf bag. This golf bag display window 110 is a view appearing after a short appearance of the application startup image upon startup of the application of the golf club management system 1 according to an embodiment of the present invention.

The golf bag display window 110 appearing on the touchscreen 61 for a display area shows, in order from top to bottom, a status bar 104, a golf bag name display section 111, a golf club display section 112, and a menu display section 115.

The status bar 104 shows receiver sensitivity, current time, and remaining battery power; the golf bag name display section 111 shows the name of the golf bag "MyBag2". The golf club display section 112 shows head images 113 of the golf clubs registered to be stored in this golf bag "MyBag2" as if the golf clubs are placed in the golf bag shown in the golf bag image 114. This is because the head images are disposed in such a natural arrangement that head images of longer golf clubs are positioned higher and head images of shorter golf clubs are positioned lower; more specifically, head images of the golf clubs belonging to the same type group are collectively displayed as adjacent or overlapped images.

The menu display section 115 shows icons of "SHOW GOLF BAG", "MANAGE GOLF CLUBS", "MANAGE GOLF BAGS", "DOWNLOAD", and "INFORMATION". The user of the smartphone 71 hits lightly (taps) one of these icons with a finger to make an instruction to execute the processing corresponding to the icon. The golf bag display window 110 also appears when the "SHOW GOLF BAG" icon is tapped. The golf bag is designated through the golf bag management window 130 shown in FIG. 5.

In response to a tap on the "DOWNLOAD" icon in the menu display section 115, information in the golf club information table 21, the golf bag configuration information table 22, and the head image data 23 held in the storage apparatus 20 of the management server 10 are respectively copied to the golf club information table 58a, the golf bag configuration information table 58b, and the head image data 58b in the information terminal 50 via the network 30. On this occasion, all information can be copied unconditionally; however, various copy ranges can be specified, such as only the information that does not exist in the information terminal 50, only the information in the range specified by the user, and only the information related to the information currently registered in the information terminal 50. In response to a tap on the "INFORMATION" icon in the menu display section 115, version information or contact information for inquiry about the program for implementing the golf club management system 1 in the information terminal 50 may appear or a mailing application may start up to introduce this program or provide recommendation information to a third person.

Next, with reference to FIG. 5, an example of a golf bag management window 130 is described, which is shown on the display device of the smartphone 71 for the information terminal 50 according to an embodiment of the present invention. The golf bag management window 130 is opened by the golf bag management unit 53 as a result of a tap on the "MANAGE GOLF BAGS" icon in the menu display section 115 in FIG. 4.

The golf bag management window 130 shows, in order from top to bottom, a status bar 131, a title display section 132, a golf bag list display section 135, and a menu display section 139. The status bar 131 and the menu display section 139 are the same as those in the golf bag display window 110 of FIG. 4.

The title display section 132 shows the title of "MANAGE GOLF BAGS" and a plus icon 133, and an edit icon 134. The golf bag list display section 135 shows a list of registered golf bags 136. On the right of each entry of the list 136, a go to selection icon 137 is provided, and in response to a tap on it, the view on the display device is changed to a golf club selection window 150 shown in FIG. 6 through which the user specifies the types of golf clubs to be stored in (associated with) the golf bag.

In response to a tap on the middle or left of an entry of the list 136, a selection mark 138 appears; thereafter, when the "SHOW GOLF BAG" icon in the menu display section 139 is tapped with the selection mark 138 on, the golf bag display window 110 of FIG. 4 about the selected golf bag appears.

The plus icon 133 in the title display section 132 allows addition of a new golf bag, when it is tapped. In adding a new golf bag, an empty golf bag including no golf bag can of course be added but a copy of a specific existing golf bag can also be added as a new golf bag. The edit icon 134 in the title display section 132 opens a delete window (not-shown) through which an existing golf bag is selected to be deleted, when it is tapped.

Next, with reference to FIG. 6, an example of a golf club selection window 150 is described, which is shown on the display device of the smartphone 71 for the information terminal 50 according to an embodiment of the present invention. As described above, in response to a tap on the go to selection icon 137 in the golf bag management window 130 of FIG. 5, the golf club selection window 150 about the selected golf bag is opened by the golf bag management unit 53. The golf bag management unit 53 can refer to the type group table 58c shown in FIG. 3C to determine the type groups and types to be shown in the golf club selection window 150.

The golf club selection window 150 shows, in order from top to bottom, a status bar 151, a title display section 152, a golf bag name display section 154, and golf club selection decision sections (155 to 160) for individual type groups. It is of course unable to show the vertically long golf club selection window 150 on the display area of the touchscreen 61 at a time; however, the user of the smartphone 71 may scroll up or down the window by flicking on the touchscreen 61 (sweeping the touchscreen 61 with a finger) to see it. For convenience of explanation, FIG. 6 shows the entire length of the golf club selection window 150 to be seen in such a way as a view. It should be noted that some golf club selection decision sections (156 to 158) are shown with some parts omitted in the drawing.

The title display section 152 shows the title of "SELECT GOLF CLUBS" and a complete icon 153. The golf bag name display section 154 shows the name of the golf bag to be handled. In the golf club selection decision section 155, the user selects whether to use a golf club of the type group <DRIVER> and the type [Driver]. If the user selects ON by flicking the check box on the right of this section, the golf bag is managed to store a [Driver] therein; if the user selects OFF, the golf bad does not store a [Driver].

In similar, in the golf club selection decision section 156, the user selects whether to use a golf club of each type, [2W], [3W], [4W] . . . of the type group <FAIRWAY WOOD>. In this way, golf clubs are selected for all the type groups. This example is configured so that the number of golf clubs storable in a golf bag is up to 14 in accordance with the official rule and more golf clubs cannot be selected; however, this window may be configured to allow selection of 15 or more.

As described above, the types of golf clubs are those commonly used to identify golf clubs, such as [Driver], [3W], [1H], [2i], [SW], and [PT]. The type groups are obtained by grouping these types as described above. This example is configured so that the type [Driver] belongs to the type group <DRIVER>; the types [2W] to [7W], [9W], [11W], and [13W] belong to the type group <FAIRWAY WOOD>; the types [1H] to [7H] belong to the type group <UTILITY>; the types [1i] to [9i] and [PW] belong to the type group <IRON>; the types [AW], [GW], [SW], and [LW] belong to the type group <WEDGE>; and the type [PT] belongs to the type group <PUTTER> with reference to the type group table 58c in FIG. 9A.

Upon completion of the selection of golf clubs, the user taps the complete icon 153 to return to the golf bag management window 130 of FIG. 5. At this time, the golf bag management unit 53 updates the golf bag configuration information table 58b and stores "0" in the entries of the types specified as OFF and "Null" in the entries of the types specified as ON.

Next, with reference to FIG. 7, an example of a golf club information display window 170 is described, which is shown on the display device of the smartphone 71 for the information terminal 50 according to an embodiment of the present invention. In response to a tap on the "MANAGE GOLF CLUBS" icon in the menu display section in the golf bag display window 110 of FIG. 4 or the golf bag management window 130 of FIG. 5, the golf club management unit 52 shows detailed information on the golf clubs stored in the selected golf bag in the golf club information display window 170. The golf club management unit 52 acquires golf club numbers of the golf clubs registered in the designated golf bag from the golf bag configuration information table 58b and then acquires information on each golf club from the golf club information table 58a to show the information.

The golf club information display window 170 shows, in order from top to bottom, a status bar 171, a title display section 172, a golf bag name display section 173, golf club information display sections (174 to 179) showing information on individual golf clubs, and a menu display section 180. The golf club information display window 170 consists of a vertically long first view 181 and a vertically long second view 182 attached to the right of the first view 181; this window is larger than the display area of the touchscreen 61 and cannot be seen at a time. However, the user of the smartphone 71 may scroll the window up, down, left, or right by flicking on the touchscreen 61 (swiping the touchscreen 61 with a finger) to see it. For convenience of explanation, FIG. 7 shows the entire length and width of the golf club information display window 170 to be seen in such a way as a view. It should be noted that the showing between the golf club information display sections 177 and 178 is partly omitted in the drawing.

The golf club information display section 174 shows detailed information on a golf club of the type [Driver]. This information is acquired from the golf club information table 58a and the golf bag configuration information table 58b and shown by the golf club management unit 52. As to the head image 183, the golf club management unit 52 retrieves the head image data name in the golf club information table 58a, then acquires a file having the same name from the head image data 58d to show it. The same applies to the golf clubs such as the type [3W] and [5W] to show detailed information thereon.

Figure 8:
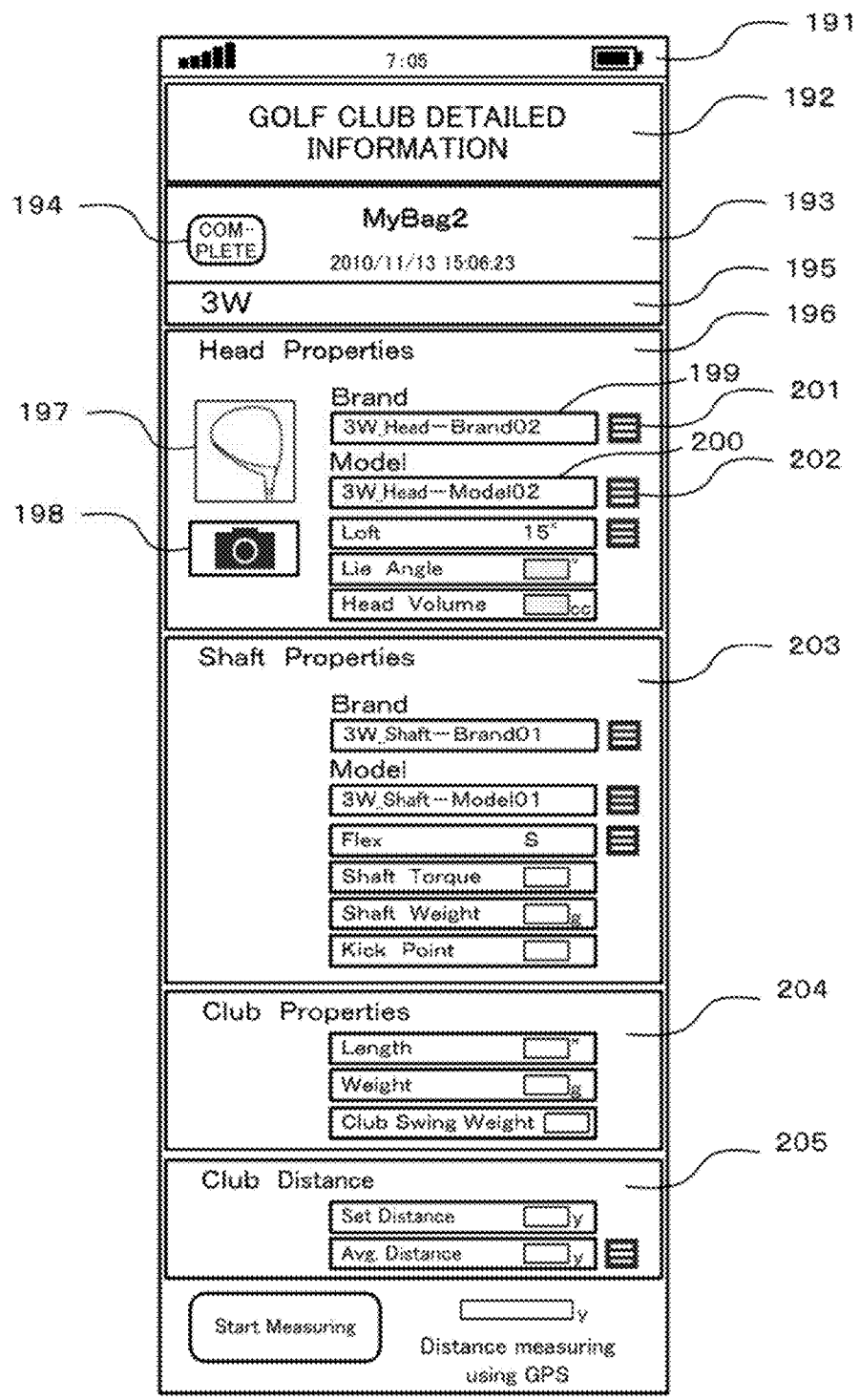
FIG. 8 is a schematic diagram illustrating an example of a golf club detailed information registration window appearing in the golf club management system according to an embodiment of the present invention.

Next, with reference to FIG. 8, an example of a golf club detailed information registration window 190 is described, which is shown on the display device of the smartphone 71 for the information terminal 50 according to an embodiment of the present invention. In response to a tap on a head image 113 in the golf bag display window 110 of FIG. 4 or a head image 183 in the golf club information display window 170 of FIG. 7, the golf club management unit 52 opens this window for the corresponding golf club. FIG. 8 is shown as a vertically long view because of the same reason as FIG. 6, which is for convenience.

The golf club detailed information registration window 190 shows, in order from the top, a status bar 191, a title display section 192, and a golf bag name display section 193. On the left of the golf bag name display section 193, a complete icon 194 is provided. Under the golf bag name display section 193, a type display section 195, a head information display section 196, a shaft information display section 203, a club information display section 204, and a carry distance information section 205 are further provided. Such detailed information on a golf club may be shown with some part omitted or shown in a plurality of separate windows (pages).

When showing the golf club detailed information registration window 190, the golf club management unit 52 refers to the golf club information table 58a and the golf bag configuration information table 58b to determine whether any golf club of the particular type is registered in the designated golf bag. If such a golf club is not registered, it opens a new window in which all fields are empty; if some golf club is registered, it opens a window showing the information on the club. That is to say, the golf club detailed information registration window 190 is a window for registering detailed information on a new golf club and a window for showing/editing detailed information on an existing golf club.

When the user taps the camera icon 198 in the head information display section 196, the image pickup control unit 56 activates the camera module to prepare to capture an image of a golf club head. Then, when the user takes a picture of the head of the golf club, the image data is stored in the head image data 58 without change (or after being edited or adjusted) and the head image is displayed in the head image display section 197. In the case of no built-in camera, a tap on the head image display section 197 may call up a head image import menu, where the user may specify a head image associated with a different golf club or a head image provided by the management server 10 or other server to display the specified head image in the head image display section 197. When displaying the image, the head image may be edited or adjusted to meet conditions such as the size of the display area.

The user fills in the brand input field 199 and the model input filed 200 using a software keyboard or something else and as a result, if the golf club management unit 52 determines that the golf club is registered in this smartphone 71 (or the management server 10 or other server), it acquires the remaining information from the golf club information table 58a to automatically set it to the input fields.

When the user taps the reference icon 201 on the right of the brand input field 199 in the head information display section 196, a list of golf club brands registered in this smartphone 71 is called up to allow the user to select one of them. The range to be referenced may be broadened to the management server 10 or other server. A separate table of brands, which should be updated as necessary, may be created and stored in the smartphone 71. In the case of a new brand, the user should input information from the beginning.

Next, when the user taps the reference icon 202 on the right of the model input field 200 in the head information display section 196, the models belonging to the selected brand are retrieved and shown as a list. The user can select one of them. The range to be referenced can be broadened to the management server 10 or other server. A separate table of brands and models, which should be updated as necessary, may be created and stored in the smartphone 71. In the case of a new model, the user should input information from the beginning.

In the same way as described above, the user inputs necessary information to the remaining input fields of the head information display section 196 and the input fields of the shaft information display section 203, the club information display section 204, and the carry distance display section 205.

Upon completion of inputs, the user taps the complete icon 194 on the left of the golf bag name display section 193. Then, if some input field on the display has been updated, the golf club management unit 52 updates the golf club information table 58a with the input information. If the head image display section 197 is changed, it updates the head image data 58d. Thereafter, the view is returned to the window that called up the golf club detailed information registration window 190, namely, the golf bag display window 110 of FIG. 4 or the golf club information display window 170 of FIG. 7. In the case of a registration of a new golf club, the golf club management unit 53 takes a new golf club number to create a new record in the golf club information table 58a.

The explanation of FIGS. 4 to 8 has been provided assuming that a smartphone 71 is used as an information terminal 50; however, this is merely an example and the golf club management system of the present invention can be implemented in other kind of information terminal 50, such as a mobile phone, a PDA, or a PC 72. The user operation "tap" in the foregoing description may be performed by holding down the enter button in the case of a mobile phone or a PDA or by mouse-clicking or holding down of an enter key in the case of a PC 72. The user operation "flick" may be performed by holding down the button for up, down, left, or right direction of the cross key in the case of a mobile phone or a PDA or by mouse-clicking of a specific area or holding down of an arrow key in the case of a PC 72. The smartphone 71 allows inputs in text with a software keyboard appearing on the touchscreen 61; this operation can be performed by tapping buttons for up, down, left, and right directions of the cross key and numeric keys in the case of a mobile phone or a PDA or by typing keys on the keyboard in the case of a PC 72.

Next, with reference to FIGS. 9 to 11, described is control by the golf bag display control unit 54 to show golf clubs registered in a designated golf bag in such a manner as shown in the golf bag display window 110 of FIG. 4. The golf bag display control unit 54 identifies the type of each golf club to be displayed (for example, each golf club registered in a designated golf bag) and the type group to which each identified type belongs to, and ultimately determines how many golf clubs are included in each type group (type group distribution pattern). In accordance with the type group distribution pattern, the golf bag display control unit 54 determines the position to display each golf club.

FIGS. 9A and 9B provide examples of the type group table 58c shown in FIG. 3C in more detail to show relations between type groups and types. As previously described, each type group is discretionally defined so as to include at least one type. The type group table 58c of Pattern 1 shown in FIG. 9A is the most basic pattern. Specifically, the type group <DRIVER> includes only one type [Driver]; the type group <FAIRWAY WOOD> includes nine types: [2W] to [7W], [9W], [11W], and [13W]; and the type group <PUTTER> includes only one type [PT].

The order of layout in FIG. 9A indicates the order (in height) of displaying the head images of golf clubs of individual type groups on the display device. In the case of FIG. 9A, the head image of a golf club belonging to the type group <DRIVER> (the golf club of the type [Driver]), which ranks highest in the order of layout, is shown at the highest position; the head images of golf clubs belonging to the type group <FAIRWAY WOOD> are shown at the next highest position; and the head image of a golf club belonging to the type group <PUTTER> is shown at the lowest position.

The information terminal 50 in an embodiment of the present invention collectively shows head images of the golf clubs in the same type group as an image group of adjacent or overlapping images; however, the head images are disposed so as to satisfy either one of the following conditions: one is such that the top of the head images of a higher ranked type group in the order of layout is positioned higher than the top of the head images of a lower ranked type group; and the other is such that the bottom of the head images of a higher ranked type group in the order of layout is positioned higher than the top of the head images of a lower ranked type group. The reason of such regulation is that two image groups on the display are different in size because of the difference in the number of golf clubs belonging to each type group and consequently, the both of the top and the bottom of the head images of the higher ranked type group might not be able to be higher than the head images of the lower ranked type group.

The type group table 58c of Pattern 2 shown in FIG. 9B is a table for the case where some types of putters are considered. In this example, the single type group <PUTTER> in Pattern 1 is treated as three type groups: <PUTTER>, <MIDDLE PUTTER> and <LONG PUTTER>. In this way, the concept of each type group can be decided as appropriate by the user of the information terminal 50 or the designer of the golf club management system 1. For example, <IRON> is a single type group in the examples of FIGS. 9A and 9B, but this group may be separated into two or three groups for management.

Figure 10A:
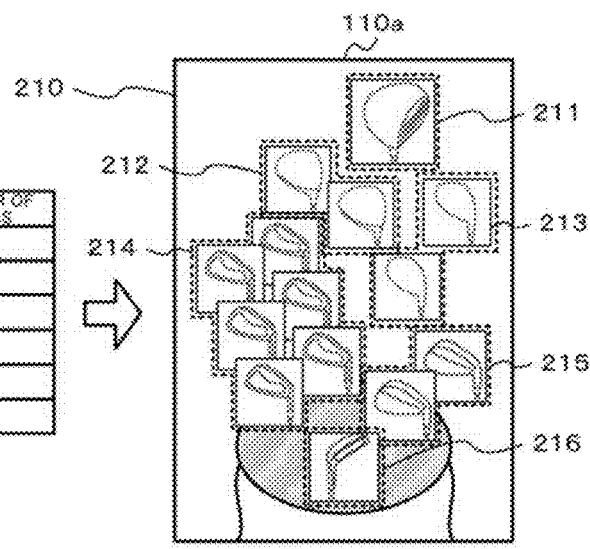
FIGS. 10A, 10B, and 10C are a set of schematic diagrams illustrating examples of control to display a golf bag, which is performed in the golf club management system according to an embodiment of the present invention.
Figure 10B:
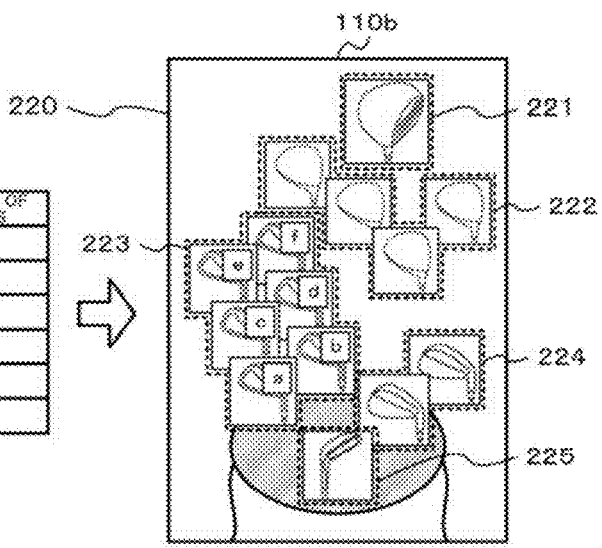
Figure 10C:
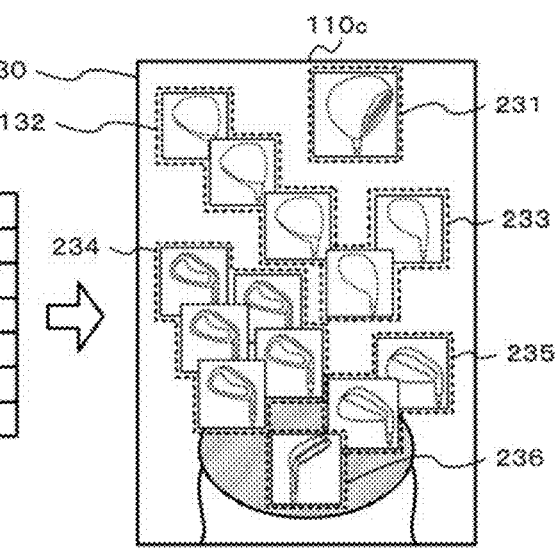

FIGS. 10A, 10B, and 10C show variations in layout of head images of golf clubs in the golf bag display window 110 depending on the type group distribution pattern. FIGS. 10A, 10B, and 10C show head image layouts in three different distribution patterns in the case where the type group configuration is Pattern 1 in FIG. 9A.

FIG. 10A indicates that, in the case where the numbers of golf clubs are 1 for the type group <DRIVER>, 2 for <FAIRWAY WOOD>, 2 for <UTILITY>, 6 for <IRON>, 2 for <WEDGE>, and 1 for <PUTTER>, the golf bag display window 110a as shown on the right will be displayed.

Specifically, the head image of a driver is displayed at the position of a display area 211; the head images of two fairway woods are displayed at the position of a display area 212 so as to be adjacent to or overlapped with each other; the head images of two utilities are displayed at the position of a display area 213 so as to be adjacent to or overlapped with each other; the head images of six irons are displayed at the position of a display area 214 so as to be adjacent to or overlapped with one another; the head images of two wedges are displayed at the position of a display area 215 so as to be adjacent to or overlapped with each other; and the head image of a putter is displayed at the position of a display area 216. As to the height in layout, images of the type group <DRIVER> for the highest position to the type group <PUTTER> for the lowest position are displayed in order as specified in FIG. 9A. For clarity of explanation, FIGS. 10A, 10B, and 10C show dotted lines representing the boundaries of display areas but these dotted lines are virtual ones which do not actually appear on the display device. In this example, same head images are used for the golf clubs of the same type group; however, different head images corresponding to the individual golf clubs may be displayed.

In similar, FIG. 10B indicates that, in the case where the numbers of golf clubs are 1 for the type group <DRIVER>, 4 for <FAIRWAY WOOD>, 0 for <UTILITY>, 6 for <IRON>, 2 for <WEDGE>, and 1 for <PUTTER>, the golf bag display window 110*b* as shown on the right will be displayed.

Specifically, the head image of a driver is displayed at the position of a display area 221; the head images of four fairway woods are displayed at the position of a display area 222 so as to be adjacent to or overlapped with each other; the head images of six irons are displayed at the position of a display area 223 so as to be adjacent to or overlapped with one another; the head images of two wedges are displayed at the position of a display area 224 so as to be adjacent to or overlapped with each other; and the head image of a putter is displayed at the position of a display area 225. As to the height in layout, images of the type group <DRIVER> for the highest position to the type group <PUTTER> for the lowest position are displayed in order, like in FIG. 10A.

FIG. 10C is based on a type group distribution different from those in FIGS. 10A and 10B and shows a golf bag display window 110*c* in a layout pattern different from the foregoing.

Taking an example of FIG. 10B, six golf clubs are selected for the type group <IRON> from ten clubs of the types [1i] to [PW]. Regardless of the types of six irons, six head images are disposed in the same display area 223 as shown on the right of FIG. 10B. However, the layout of the head images within the display area 223 is controlled so that the head image of a golf club having a long club length will be positioned higher. In the golf bag display window 110*b* in FIG. 10B, the head image denoted by the letter f is of the golf club having the longest club length and the head image denoted by the letter a is of the golf club having the shortest club length. The layout in this example is determined based on the club length; however, the ordering within the same type group is not requisite and the head images can be displayed randomly. Alternatively, ordering based on a different criterion may be employed, such as a predetermined order of types or an order of frequency of use. This display control method applies to the other type groups.

This example of the display control method predetermines and stores the coordinates of the positions to display head images by type group distribution pattern. For example, as to the display area 223 in the golf bag display window 110*b* in FIG. 10B, six pairs of positional coordinates for the upper left corners of head images to be displayed (denoted by the letters a to f) are stored. Such pairs of coordinates can be automatically determined based on the type group distribution pattern and the number of golf clubs belonging to each type group.

The size of each head image can be predetermined (for each type group distribution pattern or each pair of coordinates to show the image) depending on the type group distribution pattern. A head image is scaled down or up (adjusted in length and width) to be the predetermined size when being displayed or before being displayed. If a plurality of head images are to be displayed, they are disposed so as to overlap with adjacent head images as shown in the most of all the display areas in FIGS. 10A, 10B, and 10C; however, they do not need to overlap with one another. As shown in the display area 213, the sizes or layout of the head images may be adjusted to show the head images without overlap, for at least a part of them.

Each head image calls up detailed information on the corresponding golf club (the golf club detailed information registration window 190 shown in FIG. 8) when tapped (in the case of a smartphone 71). Accordingly, the area of a head image displayed without overlapping with other head images is adjusted to have a size which at least allows operations by a finger of the user.

Since the head images are shown on the display device in such a manner and positions that they are stored in a golf bag, they are adjusted in horizontal layout as well as vertical layout. For example, the distance between the left end of a display area and the leftmost end of the head images therein and the distance between the right end of a display area and the rightmost end of the head images therein may be adjusted to be wider than a predetermined width. Furthermore, the distance between the left end of the image of the golf bag (golf bag image 114 in FIG. 4) and the left end of the head image disposed leftmost and the distance between the right end of golf bag image and the right end of the head image disposed rightmost may be adjusted to be within a predetermined width.

To show the golf bag more realistic, some shafts of golf clubs may be randomly displayed in the golf bag display window. In the golf bag display window 110 of FIG. 4, four shafts are displayed in the background. The golf bag display control unit 54 can improve its control to show these shafts so as to extend and connect to the ends of the shafts appearing in the lower part of the head images.

FIG. 11 is a flowchart illustrating an outline of processing performed by the golf bag display control unit 54 when the "Show golf bag" icon is tapped on, for example, the menu display section 139 in FIG. 5. First, at step S10, the golf bag display control unit 54 refers to the golf bag configuration information table 58*b* to identify the golf clubs included in the designated golf bag. In this example, the golf clubs are identified with the golf club numbers stored in the golf bag configuration information table 58*b*. The designated golf bag is a golf bag designated or determined to be displayed when the "Show golf bag" icon is tapped. At this time, a plurality of golf clubs, instead of a golf club, may be designated to be identified for display.

Next, at step S12, the golf bag display control unit 54 refers to the golf club information table 58*a* to acquire information on the golf clubs, such as club lengths and head image data names. On this occasion, it is necessary to identify the types of the golf clubs; the database structure in this example allows it at either step S10 or S12 (that is to say, by referring to the entry position in the golf bag configuration information table 58*b* at step S10 or by referring to the column of the type in the golf club information table 58*a* at step S12). Then, at step S14, the golf bag display control unit 54 identifies the type group of each type with reference to the type group table 58*c* to determine the number of golf clubs in each type group (the type group distribution pattern) in the designated golf bag.

At step S16, the golf bag display control unit 54 acquires a display pattern of golf club head images determined in accordance with the type group distribution pattern. The display pattern includes sets of coordinates for each type group, where the number of sets corresponds to the number of golf clubs included in the type group; the positions to display the golf club head images are eventually determined based on the coordinates. Next, at step S18, the golf bag display control unit 54 determines the coordinates to display the head images of the golf clubs in the same type group in accordance with the club lengths. In this example, the display coordinates are determined based on the club length;

however, this step can be skipped to display the head images randomly. Alternatively, the display coordinates may be determined in accordance with a predetermined order of type or use of frequency, instead of club length.

At step S20, the golf bag display control unit 54 acquires head images to be used from the head image data 58*d* with the head image data names for the golf clubs acquired at step S12. Next, at step S22, the golf bag display control unit 54 controls the head images of the golf clubs to be disposed at determined display positions and shown in the golf bag display window 110 on the display device as shown in FIG. 4.

In the foregoing description, processing of the information terminal 50 according to an embodiment of the present invention has been explained with reference to the drawings; however, such a configuration and a processing method are merely examples. The same idea of the present invention can be embodied in other various configurations and processing methods. The foregoing description provided explanation assuming that the data is stored in table (database) structures, as illustrated in the golf club information table 58*a* and the golf bag configuration information table 58*b* in FIG. 3B; however, this is merely for convenience of explanation and the data can be stored in other known format, such as a structured text format like XML or a CSV format.

Next, with reference to FIG. 12, an example of hardware configuration of a smartphone 71 is described. The smartphone 71 is used as an information terminal 50 according to an embodiment of the present invention. It should be noted that the computer 250 in FIG. 12 merely has a typical configuration of a computer functioning as the smartphone 71.

The computer 250 includes a CPU (Central Processing Unit) 251, a memory 252, a camera 253, a GPS control unit 254, a GPS antenna 255, a wireless signal processing unit 256, a wireless communication antenna 257, an audio control unit 258, a microphone 259, a speaker 260, a display control unit 261, an input device interface 262, a touchscreen 263, a sensor 264, an external storage medium interface 265, and a bus 266 connecting these elements.

The CPU 251 controls operations of each element in the computer 250 and performs each function under the control of the OS. For example, it controls processing of the golf club management unit 52, the golf bag management unit 53, and the golf bag display control unit 54.

The memory 252 is usually composed of a ROM (Read Only Memory), which is a non-volatile memory, and a semiconductor memory called a flash memory. The ROM stores programs to be executed at the startup of the computer 250. The flash memory stores programs to be executed by the CPU 251 to perform functions (such as the golf club management unit 52) and data such as the golf club information table 58*a*.

The camera 253 is a small-sized pickup device built in the computer 250. For the pickup element, types such as CCD and CMOS are provided. The camera 253 captures still images or videos. The captured head images of golf clubs are stored in the head image data 58*d* in the flash memory by the image pickup control unit 56.

The GPS control unit 254 receives signals from a plurality of GPS satellites via the GPS antenna 255 to determine the position of the computer 250. The obtained positional information is stored in the flash memory or other storage to be used by programs as necessary. The wireless signal processing unit 256 performs communications with a mobile phone base station via the wireless communication antenna 257 and controls transmission and reception of voice data with other apparatuses or transmission and reception of Web pages or mail data (via the Internet) with other terminals. The wireless signal processing unit 256 communicates with a wireless LAN access point via a wireless LAN using the wireless communication antenna 257 to send or receive data via the Internet (for convenience, this description is based on assumption that the wireless signal processing unit 256 and the wireless communication antenna 257 make wireless communications with a mobile phone base station and the wireless LAN access point.) The computer 250 is connected to the mobile phone network 40 or the network 30 shown in FIG. 1 via the wireless signal processing unit 256 and the wireless communication antenna 257.

The audio control unit 258 controls the microphone 259 and the speaker 260 to make calls by wireless communication and furthermore, to output audio from audio data received from a music player or a video player.

The display control unit 261 processes image data generated by the CPU 251 to output a view like the golf bag display window 110 to the display device 61*a* of the touchscreen 263. The input device interface 262 informs the CPU 251 of an operation of the user detected by the touch sensor 61*b* of the touchscreen 263 by a predetermined signal. The touchscreen 263 shows information with the display device, which is typically made of an LCD (Liquid Crystal Display), and also detects the position where the user touches (presses) the screen surface with a finger or other tool with a touch sensor, which may be resistive or capacitive.

The sensor 264 is a sensor different from the touch sensor 61*b* of the touchscreen 263 and may be a motion sensor, an optical sensor, or a proximity sensor.

The external storage medium interface 265 accesses the external storage medium 270 to retrieve data recorded therein. The external storage medium 270 can be a portable flash memory.

FIG. 12 illustrates a computer 250 in the case where a smartphone 71 is used as an information terminal 50; however, in the case where a mobile phone or a PDA is used as an information terminal 50, the computer 250 is configured so that the display control unit 261 is connected to a display device which may be an LCD and the input device interface 262 is connected to a set of buttons.

In another case where a typical PC 72 is used as an information terminal 50, the computer 250 further includes a network interface for connecting to an external network and is configured so that the display control unit 261 is connected to a built-in or independent display device which may be an LCD and the input device interface 262 is connected to a keyboard or a mouse. The camera 253, the GPS control unit 254, the GPS antenna 255, the wireless signal processing unit 256, and the wireless communication antenna 257 are not usually included in the PC 72. It should be noted that the configuration of the management server 10 is basically the same as this PC 72.

INDUSTRIAL APPLICABILITY

The information terminal of the present invention provides easy management of detailed information on golf clubs and information on golf club settings; accordingly, such information can be used for various purposes. The user or an owner of golf clubs can freely input such information on golf clubs and information on golf club settings anytime. Furthermore, the user can acquire such information from a third person.

The invention claimed is:

1. An information terminal comprising:
a storage unit for storing a plurality of golf bags, a plurality of groups of golf clubs, a plurality of individual golf clubs, head images of each of the plurality of individual golf clubs, and information indicating, for each of the plurality of individual golf clubs, belonging to a specific one of the plurality of golf bags, wherein each of the plurality of groups of golf clubs includes one or more of the plurality of individual golf clubs;
a display device;
a golf club management unit for managing the golf clubs in association with head images of the golf clubs or head images of other golf clubs; and
a display control unit for controlling head images individually associated with a plurality of golf clubs to be displayed to be shown on the display device,
wherein the display control unit displays a screen for requesting to select any one of golf bags, receives a selection of a golf bag from a user, determines that golf clubs belonging to the golf bag selected by the user from among the golf bags are to be displayed, extracts the head images corresponding to the determined golf club from the storage unit, determines positions to display the head images based on a group distribution pattern indicating how many golf clubs among the determined golf clubs to be displayed belong to each of the groups, and simultaneously displays the head images of the determined golf clubs on the determined positions of the display device, and
wherein when determining the positions to display the head images based on the group distribution pattern, the display control unit makes positions of two or more golf clubs belonging to a same group be partially overlapped with each other so that each of the head images is not fully overlapped with other head images and is selectable by a user.

2. An information terminal according to claim 1,
wherein the storage unit stores other information on the golf clubs by individual golf club, and
wherein, when one of the head images is selected, the display control unit shows at least part of the other information on a golf club associated with the selected head image on the display device.

3. An information terminal according to claim 1, wherein the display control unit shows the head images of the golf clubs in image groups collected by group on the display device.

4. An information terminal according to claim 3,
wherein positions in height to display the image groups are determined depending on corresponding groups, and adjusted to satisfy at least one of the relations:
(A) that a top of an image group determined to be displayed at a higher position is positioned higher than a top of an image group determined to be displayed at a lower position; and
(B) that a bottom of an image group determined to be displayed at a higher position is positioned higher than a bottom of an image group determined to be displayed at a lower position.

5. An information terminal according to claim 4,
wherein the storage unit stores club lengths of the golf clubs by individual golf club, and
wherein the display control unit compares club lengths of golf clubs associated with head images included in an image group for each image group and adjusts positions to display the head images in the image group in such an arrangement that golf clubs having longer club lengths are positioned higher.

6. An information terminal according to claim 1, further comprising a communication control unit for connecting to an external network and controlling data transmission and reception,
wherein the golf club management unit acquires, in accordance with an instruction of the user, at least the head image for each of the golf clubs from a predetermined server via the external network.

7. A golf club management method in an information terminal including a display device for showing information and a storage unit storing a plurality of golf bags, a plurality of groups of golf clubs, a plurality of individual golf clubs, head images of each of the plurality of individual golf clubs, and information indicating, for each of the plurality of individual golf clubs, belonging to each a specific one of the plurality of golf bags, wherein each of the plurality of groups of golf clubs includes one or more of the plurality of individual golf clubs, the golf club management method comprising:
a golf club management step for managing the golf clubs in association with head images of the golf clubs or head images of other golf clubs; and
a display control step for controlling head images individually associated with a plurality of golf clubs to be displayed to be shown on the display device,
wherein the display control step displays a screen for requesting to select any one of golf bags, receives a selection of a golf bag from a user, determines that golf clubs belonging to the golf bag selected by the user from among the golf bags are to be displayed, extracts the head images corresponding to the determined golf club from the storage unit, determines positions to display the head images based on a group distribution pattern indicating how many golf clubs among the determined golf clubs to be displayed belong to each of groups, and simultaneously displays the head images of the determined golf clubs on the determined positions of the display device,
wherein when determining the positions to display the head images based on the group distribution pattern, the display control step makes positions of two or more golf clubs belonging to a same group be partially overlapped with each other so that each of the head images is not fully overlapped with other head images and is selectable by a user.

* * * * *